United States Patent
Makabe et al.

(10) Patent No.: US 11,502,339 B2
(45) Date of Patent: Nov. 15, 2022

(54) POWER STORAGE DEVICE

(71) Applicants: HONDA MOTOR CO., LTD., Tokyo (JP); ELIIY Power Co., Ltd., Tokyo (JP)

(72) Inventors: Tomoya Makabe, Wako (JP); Takeshi Yanagisawa, Wako (JP); Masaharu Nakamori, Wako (JP); Hiroyuki Suzuki, Wako (JP); Hideyuki Sugiyama, Tokyo (JP); Hiroshi Sato, Tokyo (JP); Takeshi Sawada, Tokyo (JP); Kazutoshi Miyauchi, Tokyo (JP)

(73) Assignees: HONDA MOTOR CO., LTD., Tokyo (JP); ELIIY Power Co., Ltd., Tokyo (JP)

( * ) Notice: Subject to any disclaimer, the term of this patent is extended or adjusted under 35 U.S.C. 154(b) by 51 days.

(21) Appl. No.: 16/311,188

(22) PCT Filed: Jun. 23, 2016

(86) PCT No.: PCT/JP2016/068690
§ 371 (c)(1),
(2) Date: Dec. 19, 2018

(87) PCT Pub. No.: WO2017/221378
PCT Pub. Date: Dec. 28, 2017

(65) Prior Publication Data
US 2019/0245172 A1    Aug. 8, 2019

(51) Int. Cl.
*H01M 10/42* (2006.01)
*H01M 50/24* (2021.01)
(Continued)

(52) U.S. Cl.
CPC ......... *H01M 10/4257* (2013.01); *H01M 4/02* (2013.01); *H01M 10/425* (2013.01);
(Continued)

(58) Field of Classification Search
CPC combination set(s) only.
See application file for complete search history.

(56) References Cited

U.S. PATENT DOCUMENTS

| 4,666,009 A * | 5/1987 | Yashima | B62K 19/46 |
| | | | 180/68.5 |
| 2013/0034757 A1 | 2/2013 | Doyle | |

(Continued)

FOREIGN PATENT DOCUMENTS

| CN | 102496750 | 6/2012 |
| CN | 104953045 | 9/2015 |

(Continued)

OTHER PUBLICATIONS

International Search Report and Written Opinion for International Application No. PCT/JP2016/068690 dated Aug. 9, 2016, 9 pgs.

(Continued)

*Primary Examiner* — Ula C Ruddock
*Assistant Examiner* — Sarika Gupta
(74) *Attorney, Agent, or Firm* — Amin, Turocy & Watson, LLP

(57) ABSTRACT

The present invention provides a power storage device capable of preventing rain water, washing water, and the like from entering a casing. The power storage device of the present invention includes a secondary battery, the casing having a sealed structure, a safety valve, and a drainage through hole, the casing includes an external container configured to accommodate the secondary battery and an upper lid disposed above the external container, the upper lid has an upper surface having a concave portion formed therein, the safety valve is disposed in the concave portion, and the drainage through hole is provided to pass through a side wall of the concave portion.

24 Claims, 2 Drawing Sheets

(51) Int. Cl.
*H01M 50/20* (2021.01)
*H01M 50/46* (2021.01)
*H01M 50/147* (2021.01)
*H01M 50/325* (2021.01)
*H01M 4/02* (2006.01)

(52) U.S. Cl.
CPC ......... *H01M 50/147* (2021.01); *H01M 50/20* (2021.01); *H01M 50/24* (2021.01); *H01M 50/325* (2021.01); *H01M 50/46* (2021.01); *H01M 2010/4271* (2013.01); *H01M 2300/0017* (2013.01)

(56) References Cited

U.S. PATENT DOCUMENTS

| | | | |
|---|---|---|---|
| 2013/0344374 A1* | 12/2013 | Morishima | H01M 4/04 429/231.1 |
| 2017/0047630 A1* | 2/2017 | Cherng | H01M 50/543 |

FOREIGN PATENT DOCUMENTS

| | | |
|---|---|---|
| JP | 10-040894 | 2/1998 |
| JP | 10-228891 | 8/1998 |
| JP | 2001-102026 | 4/2001 |
| JP | 2001-297743 | 10/2001 |
| JP | 2003-045396 | 2/2003 |
| JP | 2004-031039 | 1/2004 |
| JP | 2013-004177 | 1/2013 |
| JP | 2013-218934 | 10/2013 |
| JP | 2015-008121 | 1/2015 |
| JP | 2015-507322 | 3/2015 |
| JP | 2015-138604 | 7/2015 |
| JP | 2015-176712 | 10/2015 |
| JP | 2016-018634 | 2/2016 |
| JP | 3203418 | 3/2016 |
| JP | 3203418 U * | 3/2016 ............ H01M 16/00 |

OTHER PUBLICATIONS

Extended European Search Report for European Patent Application No. 16906295.7 dated Jun. 5, 2019.
Japanese Office Action for Japanese Patent Application No. 2018-523234 dated Sep. 3, 2019.
Chinese Office Action for Chinese Patent Application No. 201680086931.5 dated Nov. 23, 2020.

* cited by examiner

POWER STORAGE DEVICE

TECHNICAL FIELD

The present invention relates to a power storage device.

BACKGROUND ART

In recent years, secondary batteries have been used for various applications, and particularly, secondary batteries having a large capacity have been used for applications such as automobile power supplies and electric power storage.

When a secondary battery is used as a single battery, a voltage of the secondary battery may be lower than a voltage required for a device in some cases. In such a case, it is necessary to connect a plurality of secondary batteries in series and to increase a supply voltage to a desired voltage. Furthermore, in a single battery, there are cases in which it is not possible to supply a sufficient amount of electricity required for a device. In such a case, it is necessary to connect a plurality of secondary batteries in parallel and to increase an amount of supplied electricity to a desired amount.

For this reason, electric power may be supplied from a power storage device having a plurality of secondary batteries connected to each other in series or in parallel accommodated in a casing to a device. Furthermore, a power storage device having a battery monitoring unit (BMU) configured to monitor a plurality of secondary batteries built thereinto is known (for example, refer to Patent Document 1). The BMU usually measures a voltage or the like of each secondary battery and detects overcharging and overdischarging at the time of charging and discharging. Furthermore, the BMU can also have a function of maintaining a voltage balance between the respective secondary batteries.

On the other hand, lead storage batteries are usually installed in automobiles, motorcycles, and the like. There is a disadvantage concerning a lead storage battery being relatively heavy. Thus, an in-vehicle power storage device including a relatively light lithium ion battery has been developed.

RELATED ART DOCUMENT

Patent Document

Patent Document 1: Japanese Unexamined Patent Application, First Publication No. 2015-8121

SUMMARY

Problems to be Solved by the Invention

When a lithium ion battery is used for an in-vehicle power storage device, it is necessary to install an electronic device such as a BMU in a power storage device to prevent overcharging or the like. Therefore, when rain water, washing water, or the like enters a power storage device, a BMU or a wiring may corrode, which may cause the power storage device to fail and cause electrical leakage. The present invention was made in view of such circumstances and provides a power storage device capable of preventing rain water, washing water, or the like from entering a casing.

Means for Solving the Problem

The present invention provides a power storage device including: a secondary battery, a casing having a sealed structure, a safety valve, and a drainage through hole, wherein the casing includes an external container having the secondary battery accommodated therein and an upper lid disposed above the external container, the upper lid has an upper surface having a concave portion formed therein, the safety valve is disposed in the concave portion, and the drainage through hole is provided to pass through a side wall of the concave portion.

Advantage of the Invention

A power storage device of the present invention can be charged and discharged because the power storage device includes a secondary battery.

The power storage device of the present invention includes a casing having a sealed structure. Thus, it is possible to prevent water from entering the casing and it is possible to prevent a power storage device from failing due to rain water, washing water, and the like.

The casing includes an external container having a secondary battery accommodated therein and an upper lid disposed above the external container. Thus, it is possible to manufacture a power storage device having a secondary battery accommodated in a casing having a sealed structure by placing the secondary battery in an external container and closing the external container using an upper lid.

The power storage device of the present invention includes a safety valve. Thus, even when a gas generated in the secondary battery is discharged into the casing and an internal pressure in the casing increases, the gas can be discharged outside of the casing through the safety valve. For this reason, it is possible to prevent the casing from expanding or rupturing.

The safety valve is disposed in a concave portion of the upper lid. Thus, it is possible to provide a safety valve without it protruding from a main upper surface of the upper lid and it is possible to adapt a size of the power storage device to an installation space. Furthermore, it is possible to effectively use a space below the main upper surface of the upper lid.

The power storage device of the present invention includes a drainage through hole provided to pass through a side wall of the concave portion. Thus, even when rain water or washing water enters the concave portion, it is possible for water to drain through this through hole. Thus, it is possible to prevent water from remaining in the concave portion having the safety valve disposed therein and it is possible to prevent water from entering the casing via the safety valve.

DESCRIPTION OF THE EMBODIMENTS

Figure 1:
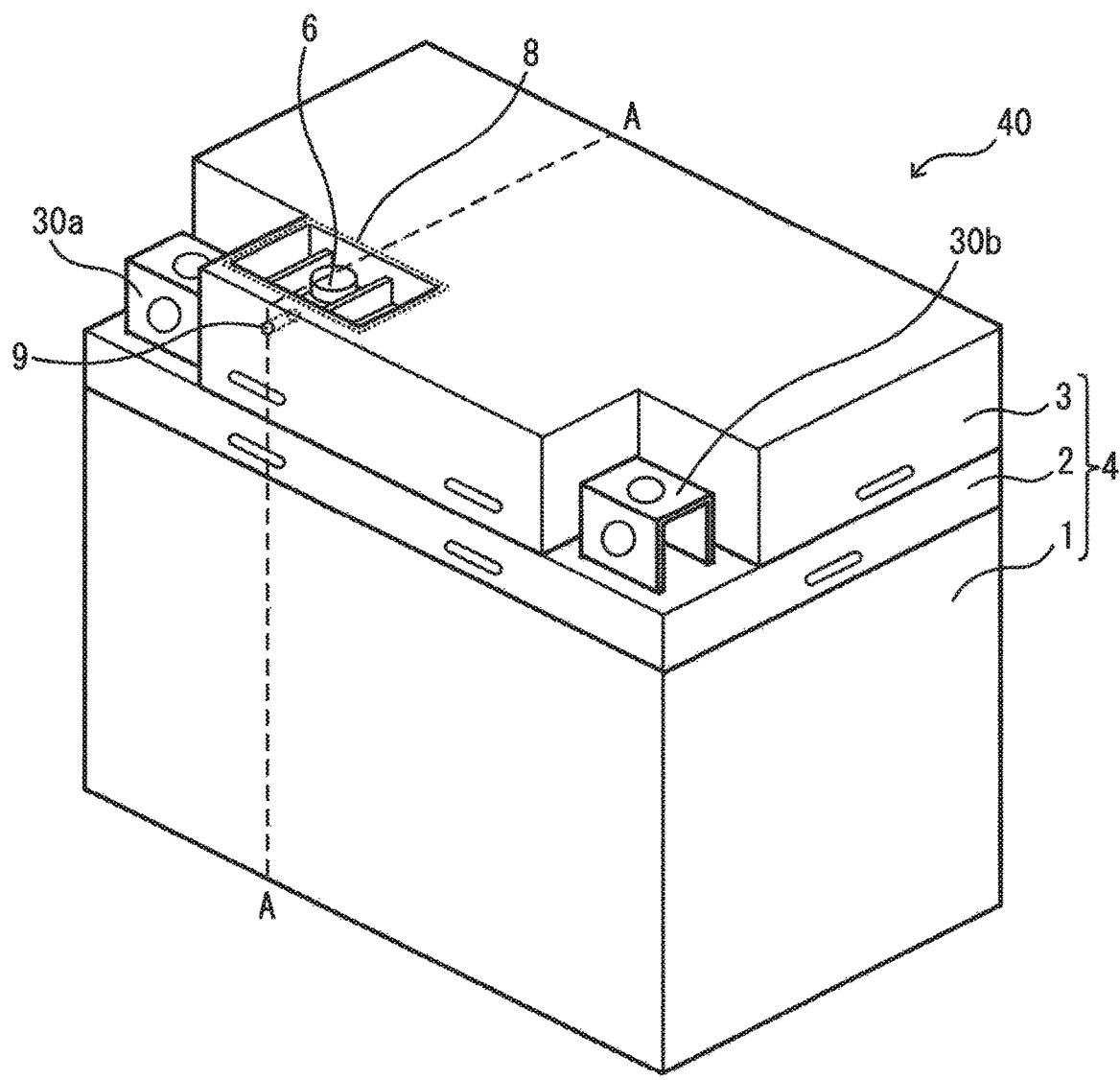
FIG. 1 is a schematic perspective view of a power storage device according to an embodiment of the present invention.

A power storage device in the present invention includes a secondary battery (a secondary battery cell), a casing having a sealed structure, a safety valve, and a drainage through hole, the casing includes an external container having the secondary battery accommodated therein and an upper lid disposed above the external container, the upper lid has an upper surface having a concave portion formed therein, the safety valve is disposed in the concave portion, and the drainage through hole is provided to pass through a side wall of the concave portion.

The safety valve included in the power storage device of the present invention preferably includes an exhaust cylinder and a cap configured to close an outlet on an outer side of the exhaust cylinder. According to such a safety valve, when an internal pressure of the casing increases, a cap elastically deforms due to this internal pressure, a gap can be formed between the cap and the exhaust cylinder, and a gas inside the casing can be discharged to the outside through this gap. When the pressure in the casing decreases to atmospheric pressure, the cap is restored to have its original shape and thus the inside of the casing can become a sealed space again.

The casing included in the power storage device of the present invention preferably includes an inner lid disposed between the secondary battery accommodated in the external container and the upper lid. The inner lid can function as a wiring board in which a wiring configured to connect the secondary battery to an external connection terminal or a wiring configured to connect the secondary battery to a battery monitoring unit is provided.

The power storage device in the present invention preferably includes a battery monitoring unit configured to monitor the secondary battery and the battery monitoring unit is preferably disposed between the inner lid and the upper lid. When the battery monitoring unit can monitor the secondary battery, it is thus possible to improve the safety of the power storage device.

Also, it is desirable that the battery monitoring unit be accommodated in the casing so as not to be located between the secondary battery and the safety valve. Thus, it is possible to dispose the battery monitoring unit at a position outside of a discharge path through which a gas generated in the secondary battery is discharged from the safety valve and to prevent adhering of a gas generated in the secondary battery or an electrolytic solution ejected from the secondary battery to the battery monitoring unit.

The power storage device in the present invention preferably further includes a protection case disposed between the inner lid and the upper lid, and it is preferable that the protection case accommodates the battery monitoring unit, and has its inside sealed. By providing the protection case, even if a solution in the secondary battery leaks, leaked electrolytic solution does not enter the protection case having the battery monitoring unit accommodated therein and it is possible to prevent damage to the battery monitoring unit.

The secondary battery included in the power storage device in the present invention preferably includes a positive electrode including a positive electrode active material, a negative electrode including a negative electrode active material, a separator sandwiched between the positive electrode and the negative electrode, a non-aqueous electrolyte, and a container having the positive electrode, the negative electrode, the separator, and the non-aqueous electrolyte accommodated therein.

An embodiment of the present invention will be described below with reference to the drawings. A constitution shown in the drawings and the following description is merely an example and the scope of the present invention is not limited to that shown in the drawings and the following description.

Figure 2:
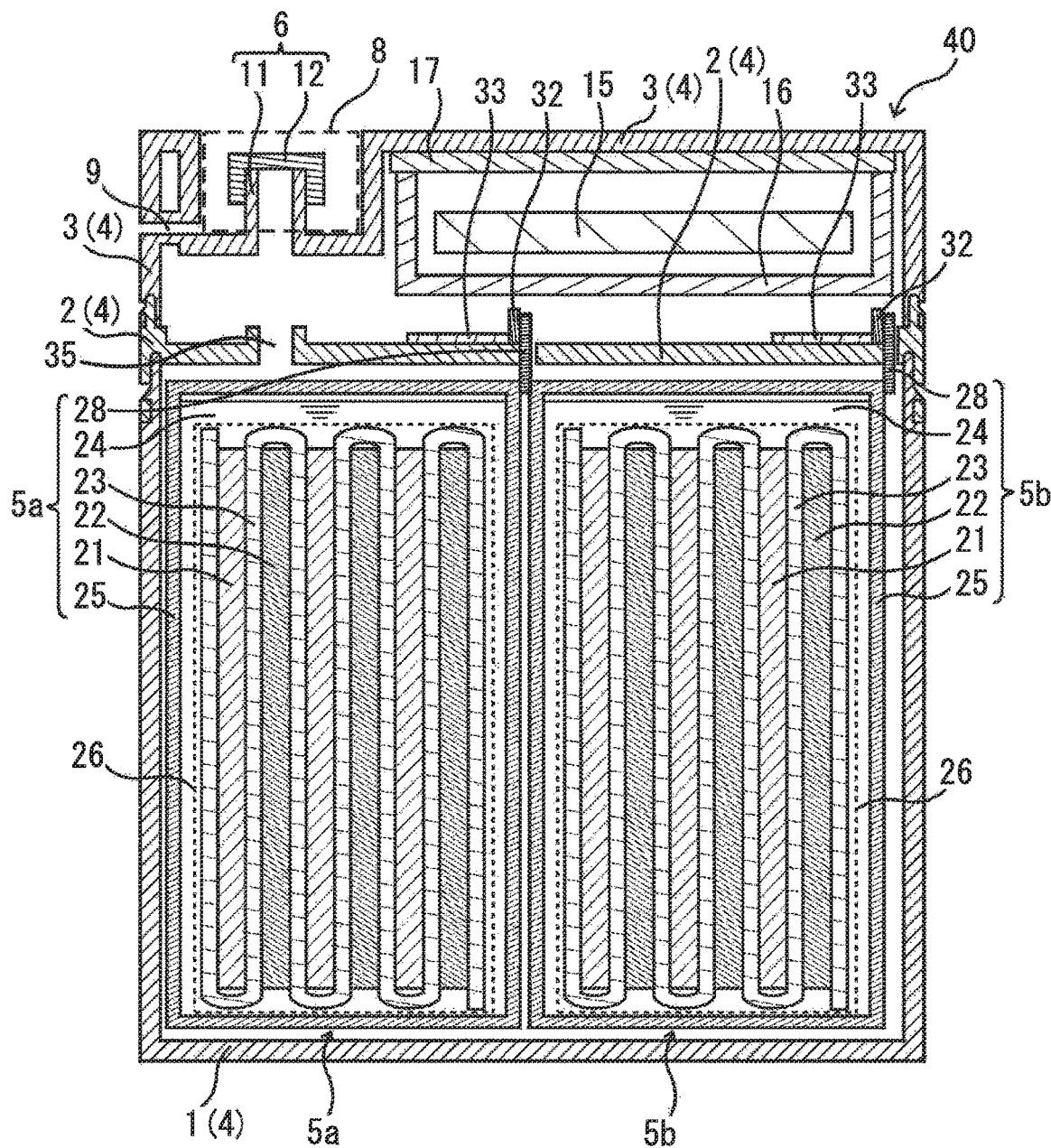
FIG. 2 is a schematic cross-sectional view of the power storage device taken along broken line A-A in FIG. 1.

FIG. 1 is a schematic perspective view of the power storage device in this embodiment and FIG. 2 is a schematic cross-sectional view of the power storage device taken along broken line A-A in FIG. 1.

A power storage device 40 in this embodiment includes a secondary battery 5, a casing 4 having a sealed structure, a safety valve 6, and a drainage through hole 9, the casing 4 includes an external container 1 having the secondary battery 5 accommodated therein and an upper lid 3 disposed above the external container 1, the upper lid 3 has an upper surface having a concave portion 8 formed therein, the safety valve 6 is disposed in the concave portion 8, and the drainage through hole 9 is provided to pass through a side wall of the concave portion 8.

Also, the power storage device 40 in this embodiment may include a battery monitoring unit 15 or a protection case 16.

The power storage device 40 in this embodiment will be described below.

1. Power Storage Device

The power storage device 40 in this embodiment is, for example, a power storage device used for a power supply of an automobile, a power supply of a motorcycle, a storage of photovoltaic power generation, a backup power supply, and the like. Furthermore, the power storage device 40 can be provided to be able to be charged and discharged. In addition, the power storage device 40 may be a sealed power storage device or an in-vehicle power storage device.

2. Secondary Battery

The power storage device 40 includes the secondary battery 5 accommodated in the casing 4. The secondary battery 5 has a positive electrode battery terminal and a negative electrode battery terminal (the positive electrode battery terminal or the negative electrode battery terminal is referred to as a "battery terminal 28" in this specification). Furthermore, the secondary battery 5 can be accommodated in the external container 1 in the casing 4 such that the positive electrode battery terminal and the negative electrode battery terminal are disposed on an upper side.

Also, the power storage device 40 can include a plurality of secondary batteries 5 accommodated in the casing 4. The plurality of secondary batteries 5 may be connected to each other in parallel or in series. Furthermore, the plurality of secondary batteries 5 may be electrically connected to each other through a wiring and the battery terminals 28 of two neighboring batteries 5 may be electrically connected to each other by bringing the battery terminals 28 into contact with each other or joining the battery terminals 28.

Each of the secondary batteries 5 is, for example, a lithium ion battery, a sodium ion battery, a nickel/hydrogen battery, a nickel/cadmium battery, and the like. The secondary battery 5 may be a sealed battery. Furthermore, the secondary battery 5 may be of an angular shape, a cylindrical type, or a pouch type. The secondary battery 5 can include a positive electrode 21 including a positive electrode active material, a negative electrode 22 including a negative electrode active material, a separator 23 sandwiched between the positive electrode 21 and the negative electrode 22, a non-aqueous electrolyte 24, and a container 25 having the positive electrode 21, the negative electrode 22, the separator 23, and the non-aqueous electrolyte 24 accommodated therein.

3. Casing, Safety Valve, and Drainage Through Hole

The power storage device 40 includes the casing 4 configured to accommodate the secondary battery 5 and having a sealed structure. The casing 4 includes the external container 1 having the secondary battery 5 accommodated therein and the upper lid 3 disposed above the external container 1. Furthermore, the casing 4 can include an inner lid 2 disposed between the external container 1 and the upper lid 3. The secondary battery 5 can be accommodated in the casing 4 having the sealed structure by inserting the secondary battery 5 into the external container 1 before these members constituting the casing 4 are bonded together.

The inner lid 2 can function as a wiring board in which a wiring 33 configured to connect the secondary battery 5 to an external connection terminal 30 or the wiring 33 configured to connect the secondary battery 5 to the battery monitoring unit 15 is provided. Furthermore, the inner lid 2 can have a slit through which the battery terminal 28 of the secondary battery 5 passes and the battery terminal 28 can be joined to a connection portion 23 provided on an upper surface of the inner lid 2. Thus, the wiring 33 on the upper surface of the inner lid 2 and the secondary battery 5 can be electrically connected to each other.

The inner lid 2 can have a through hole 35 immediately below the safety valve 6. Thus, when a gas is generated from the secondary battery 5, the gas can be discharged outside of the power storage device 40 using the through hole 35 and the safety valve 6 as a discharge path. Thus, it is possible to prevent the casing 4 from being filled with a gas generated from the secondary battery 5 and to prevent the battery monitoring unit 15 from being corroded due to the gas generated from the secondary battery 5.

The members constituting the casing 4 can be adhered so that the inside of the casing 4 is a sealed space. Thus, it is possible to prevent water or the like from entering the casing 4 and to improve the safety and the lifespan characteristics of the power storage device 40. The members constituting the casing 4 can be adhered using, for example, an adhesive. It should be noted that a material of the casing 4 may be a plastic.

The upper lid 3 has an upper surface having the concave portion 8 formed therein. Furthermore, the safety valve 6 (relief valve) is provided in the concave portion 8 of the upper lid 3. The safety valve 6 has a structure in which, when an internal pressure of the casing 4 increases abnormally, the valve automatically opens, a gas inside the casing 4 is discharged to the outside, the internal pressure decreases, and when the internal pressure decreases, the valve automatically closes. By providing the safety valve 6 in the upper lid 3, even when a gas generated in the secondary battery 5 is discharged into the casing 4 and an internal pressure of the casing 4 increases, it is possible to discharge the gas outside of the casing 4 through the safety valve 6. For this reason, it is possible to prevent the casing 4 from expanding, rupturing, or being damaged.

The safety valve 6 can include an exhaust cylinder 11 and a cap 12 configured to close an outlet on an outer side of the exhaust cylinder 11. For example, as in the power storage device 40 shown in FIG. 2, the exhaust cylinder 11 and the cap 12 can be provided. The exhaust cylinder 11 can be provided in the upper lid 3. Furthermore, an opening in the exhaust cylinder 11 can be provided to pass through the upper lid 3. A material of the cap 12 can be rubber and the cap 12 can be formed in a shape in which the cap 12 covers an outer end of the exhaust cylinder 11. The inside of the casing 4 can be made a sealed space by the rubber elasticity of the cap 12. Furthermore, when an internal pressure of the casing 4 increases, the cap 12 elastically deforms due to this internal pressure, a gap can be formed between the cap 12 and the exhaust cylinder 11, and a gas inside the casing 4 can be discharged to the outside through this gap. When the pressure in the casing 4 decreases to atmospheric pressure, the cap 12 is restored to have its original shape and thus the inside of the casing 4 can become a sealed space.

The safety valve 6 can include a valve pressing plate above the cap 12. Thus, when a gas inside the casing 4 is discharged through the safety valve 6, it is possible to prevent the cap 12 from being removed from the exhaust cylinder 11.

The safety valve 6 is disposed in the concave portion 8 of the upper lid 3. For this reason, the safety valve 6 can be provided without it protruding from a main upper surface of the upper lid 3 and a size of the power storage device 40 can be adapted for an installation space. Furthermore, it is possible to effectively use a space below the main upper surface of the upper lid 3. When the power storage device 40 is, for example, a battery for a motorcycle, it is necessary to form the power storage device 40 so that the power storage device 40 can be installed in various motorcycles of various vehicle types and it is necessary to match the power storage device 40 to a predetermined size. For this reason, when the safety valve 6 is provided to protrude from the main upper surface of the upper lid 3, an unavailable dead space is generated above the main upper surface. By disposing the safety valve 6 in the concave portion 8, it is possible to prevent the generation of such a dead space. Furthermore, for example, it is possible to accommodate a battery monitoring unit (BMU) below the main upper surface of the upper lid 3 and it is possible to increase the size of the secondary battery 5. Thus, it is possible to increase a battery capacity of the power storage device 40.

The power storage device 40 has the drainage through hole 9 provided to pass through the side wall of the concave portion 8. Furthermore, the drainage through hole 9 can have an inlet located in an inner wall surface of the concave portion 8 and an outlet located in a side surface of the upper lid 3. Thus, even if rain water or washing water enters the concave portion 8, it is possible for water to drain through the through hole 9. Thus, it is possible to prevent water from remaining in the concave portion 8 having the safety valve 6 disposed therein and to prevent water from entering the casing 4 via the safety valve 6.

The inlet of the through hole 9 can be provided close to the bottom of the concave portion 8. Furthermore, the through hole 9 can be provided to be inclined downward from the inlet toward the outlet.

The drainage through hole 9 may be a through hole configured to pass through a part of the upper lid 3. Furthermore, the drainage through hole 9 may be formed by forming a tubular portion in the upper lid 3. The drainage through hole 9 may be formed by combining a tubular member with the upper lid 3.

4. Battery Monitoring Unit

The battery monitoring unit 15 is a part configured to monitor the secondary battery 5. The battery monitoring unit 15 can be disposed between the inner lid 2 and the upper lid 3. Furthermore, the battery monitoring unit 15 can be provided not to overlap the concave portion 8. The battery monitoring unit 15 can be disposed not to be located on the discharge path through which a gas generated from the secondary battery 5 is discharged from the safety valve 6.

The battery monitoring unit 15 may be, for example, an electronic circuit board obtained by mounting electronic components thereon. The battery monitoring unit 15 may be a part of an electronic circuit board. The battery monitoring unit 15 may include a plurality of electronic circuit boards. Furthermore, the battery monitoring unit 15 can be accommodated in the protection case 16. The battery monitoring unit 15 can be electrically connected to the secondary battery 5, a fuse, a relay, or the external connection terminal 30. Thus, the battery monitoring unit 15 can monitor the battery.

The battery monitoring unit 15 can be provided to measure a voltage of each secondary battery 5. Furthermore, the battery monitoring unit 15 can be provided to detect overcharging on the basis of the results of voltage measurement of the secondary battery 5. The battery monitoring unit 15 can be provided to output a signal for disconnecting the connection between the secondary battery 5 and the external connection terminal 30 through the fuse or the relay when detecting overcharging in at least one of the secondary batteries 5. Thus, it is possible to forcibly cut off a current and to improve the safety of the power storage device 40 when overcharging is generated in at least one of the secondary batteries 5.

The battery monitoring unit 15 may be provided to detect overdischarging of the secondary battery 5, to measure a temperature inside the casing 4, or to detect an overcurrent. Furthermore, the battery monitoring unit 15 can be provided to maintain a balance between voltages of a plurality of secondary batteries 5 accommodated in the external container 1. Thus, it is possible to reduce damage to the plurality of secondary batteries 5 generated due to imbalance in the voltages of the secondary batteries 5 and to improve lifespan characteristics of the power storage device 40. It should be noted that the battery monitoring unit 15 can include a balancer corresponding to each of the secondary batteries 5.

5. Protection Case

The protection case 16 is a case having the battery monitoring unit 15 accommodated therein, is accommodated in the casing 4, and is sealed so that the inside thereof is a sealed space. For this reason, it is possible to separate a space having the secondary battery 5 in the casing 4 accommodated therein from a space having the battery monitoring unit 15 accommodated therein. With this constitution, even if a solution in the secondary battery 5 leaks, leaked electrolytic solution does not enter the protection case 16 having the battery monitoring unit 15 accommodated therein and it is possible to prevent damage to the battery monitoring unit 15. For this reason, it is possible to improve the safety of the power storage device 40. The protection case 16 can be disposed between the inner lid 2 and the upper lid 3. The protection case 16 is, for example, a plastic case.

As in the power storage device 40 shown in FIG. 2, a sealed space having the battery monitoring unit 15 disposed therein may be formed by the protection case 16 and a seal member 17. Furthermore, this sealed space may be formed by the protection case 16, the seal member 17, and the casing 4, may be formed by the protection case 16 and the casing 4, and may be formed by only the protection case 16. The seal member 17 is, for example, a rubber sheet. As in the power storage device 40 shown in FIG. 2, the seal member 17 may be provided to cover an opening of the protection case 16. Furthermore, the seal member 17 may be provided between the casing 4 and an upper surface of a side wall of the protection case 16. The seal member 17 may be sandwiched between the protection case 16 and the casing 4. Thus, the seal member 17, the protection case 16, and the casing 4 can be brought into contact with each other and the inside of the protection case 16 can become a sealed space. Furthermore, for example, the inside of the protection case 16 may be made a sealed space by adhering the protection case 16 to the casing 4 using an adhesive.

The protection case 16 can include a connection terminal on an outer side of the protection case 16. This connection terminal is electrically connected to the battery monitoring unit 15. Furthermore, a part of a wiring between the connection terminal and the battery monitoring unit 15 may be embedded in the protection case 16. Thus, the connection terminal and the battery monitoring unit 15 can be electrically connected to each other in a state in which the inside of the protection case 16 is a sealed space. Furthermore, the protection case 16 can include a plurality of connection terminals. Thus, the battery monitoring unit 15 can be electrically connected to wirings between secondary batteries 5 and wirings between the secondary batteries 5 and the external connection terminal 30 and the battery monitoring unit 15 can monitor a voltage of each of the secondary batteries 5. The connection terminal can be joined to a wiring terminal on the battery monitoring unit side of the inner lid 2. Thus, the battery monitoring unit 15 and the secondary battery 5 can be electrically connected to each other via the wiring 33.

BRIEF DESCRIPTION OF THE REFERENCE SYMBOLS

1: External container
2: Inner lid
3: Upper lid
4: Casing
5, 5a, 5b: Secondary battery
6: Safety valve
8: Concave portion
9: Drainage through hole
11: Exhaust cylinder
12: Cap
15: Battery monitoring unit
16: Protection case
17: Seal member
21: Positive electrode
22: Negative electrode
23: Separator
24: Non-aqueous electrolyte
25: Container
28: Battery terminal
30, 30a, 30b: External connection terminal
32: Connection portion
33: Wiring
35: Through hole
40: Power storage device

What is claim is:

1. A power storage device comprising: a secondary battery, a casing having a sealed structure, a safety valve, and a drainage through hole, wherein the casing includes an external container having the secondary battery accommodated therein and an upper lid disposed above the external container, the upper lid has an upper surface having a concave portion formed therein, the safety valve is disposed in the concave portion, the drainage through hole is provided to pass through a side wall of the concave portion and a side wall of the upper lid of the casing, the safety valve has a convex shape that extends along the side wall of the concave portion and is provided without the upper lid protruding from a main upper surface of the upper lid, the safety valve has an exhaust cylinder and a cap configured to close an external outlet of the exhaust cylinder, the cap is disposed above an inlet of the drainage through hole, two external connection terminals are arranged above the external container, the upper lid and the external connection terminal are arranged adjacent to each other, the concave portion is arranged between the external connection terminals, the drainage through hole is provided on the side wall of the upper lid which is arranged between the external connection terminals, and an inside of the upper lid is concave.

2. The power storage device as claimed in claim 1, wherein:
the exhaust cylinder is provided in the upper lid,
the cap is configured to cover an upper end of the exhaust cylinder and is configured to close the external outlet of the exhaust cylinder so that a gap can be formed between the cap and the exhaust cylinder by elastic deformation,
the drainage through hole has an inlet close to a bottom of the concave portion, and
a lower end of the cap is configured to be arranged above the inlet of the drainage through hole.

3. The power storage device according to claim 1, further comprising
a battery monitoring unit configured to monitor the secondary battery,
wherein the battery monitoring unit is accommodated in the casing so as not to be located between the secondary battery and the safety valve.

4. The power storage device according to claim 2, further comprising
a battery monitoring unit configured to monitor the secondary battery,
wherein the battery monitoring unit is accommodated in the casing so as not to be located between the secondary battery and the safety valve.

5. The power storage device according to claim 3, further comprising
a protection case disposed between the secondary battery and the upper lid,
wherein the protection case has the battery monitoring unit accommodated therein and an inside thereof is sealed.

6. The power storage device according to claim 4, further comprising
a protection case disposed between the secondary battery and the upper lid,
wherein the protection case has the battery monitoring unit accommodated therein and an inside thereof is sealed.

7. The power storage device according to claim 1, wherein the secondary battery includes a positive electrode including a positive electrode active material; a negative electrode including a negative electrode active material; a separator sandwiched between the positive electrode and the negative electrode; and a non-aqueous electrolyte; and a container has the positive electrode, the negative electrode, the separator, and the non-aqueous electrolyte accommodated therein.

8. The power storage device according to claim 2, wherein the secondary battery includes a positive electrode including a positive electrode active material; a negative electrode including a negative electrode active material; a separator sandwiched between the positive electrode and the negative electrode; and a non-aqueous electrolyte; and a container has the positive electrode, the negative electrode, the separator, and the non-aqueous electrolyte accommodated therein.

9. The power storage device according to claim 3, wherein the secondary battery includes a positive electrode including a positive electrode active material; a negative electrode including a negative electrode active material; a separator sandwiched between the positive electrode and the negative electrode; and a non-aqueous electrolyte; and a container has the positive electrode, the negative electrode, the separator, and the non-aqueous electrolyte accommodated therein.

10. The power storage device according to claim 4, wherein the secondary battery includes a positive electrode including a positive electrode active material; a negative electrode including a negative electrode active material; a separator sandwiched between the positive electrode and the negative electrode; and a non-aqueous electrolyte; and a container has the positive electrode, the negative electrode, the separator, and the non-aqueous electrolyte accommodated therein.

11. The power storage device according to claim 5, wherein the secondary battery includes a positive electrode including a positive electrode active material; a negative electrode including a negative electrode active material; a separator sandwiched between the positive electrode and the negative electrode; and a non-aqueous electrolyte; and a container has the positive electrode, the negative electrode, the separator, and the non-aqueous electrolyte accommodated therein.

12. The power storage device according to claim 6, wherein the secondary battery includes a positive electrode including a positive electrode active material; a negative electrode including a negative electrode active material; a separator sandwiched between the positive electrode and the negative electrode; and a non-aqueous electrolyte; and a container has the positive electrode, the negative electrode, the separator, and the non-aqueous electrolyte accommodated therein.

13. The power storage device according to claim 1, wherein an inner lid is provided between the upper lid and the external container.

14. The power storage device according to claim 2, wherein an inner lid is provided between the upper lid and the external container.

15. The power storage device according to claim 3, wherein an inner lid is provided between the upper lid and the external container.

16. The power storage device according to claim 4, wherein an inner lid is provided between the upper lid and the external container.

17. The power storage device according to claim 5, wherein an inner lid is provided between the upper lid and the external container.

18. The power storage device according to claim 6, wherein an inner lid is provided between the upper lid and the external container.

19. The power storage device according to claim 7, wherein an inner lid is provided between the upper lid and the external container.

20. The power storage device according to claim 8, wherein an inner lid is provided between the upper lid and the external container.

21. The power storage device according to claim 9, wherein an inner lid is provided between the upper lid and the external container.

22. The power storage device according to claim 10, wherein an inner lid is provided between the upper lid and the external container.

23. The power storage device according to claim 11, wherein an inner lid is provided between the upper lid and the external container.

24. The power storage device according to claim 12, wherein an inner lid is provided between the upper lid and the external container.

* * * * *